United States Patent [19]

Stough

[11] Patent Number: 4,479,774
[45] Date of Patent: Oct. 30, 1984

[54] COMBUSTION CONTROL SYSTEM

[75] Inventor: Donald M. Stough, Jackson, Ohio

[73] Assignee: Westinghouse Electric Corp., Pittsburgh, Pa.

[21] Appl. No.: 392,978.

[22] Filed: Jun. 28, 1982

[51] Int. Cl.³ .............................................. F23N 5/00
[52] U.S. Cl. ..................................... 431/76; 431/12; 236/15 BD; 236/15 E
[58] Field of Search ...................... 431/12, 20, 76, 89, 431/90; 122/448 R; 236/15 BD, 15 E

[56] References Cited

U.S. PATENT DOCUMENTS 3,814,570 6/1974 Guigues et al. ....................... 431/76
4,249,886 2/1981 Bush ....................... 431/90
4,264,297 4/1981 Van Berkum ....................... 431/76

Primary Examiner—Randall L. Green
Attorney, Agent, or Firm—T. R. Trempus

[57] ABSTRACT

The well-known "jackshaft" positioning or two-point parallel combustion control system has been modified to include a linkage strut length adjustor apparatus with a remote actuator apparatus. The adjustor apparatus includes an overload protection system to prevent damage to the linkage and control members of the combustion control system.

16 Claims, 8 Drawing Figures

FIG.I.
PRIOR ART

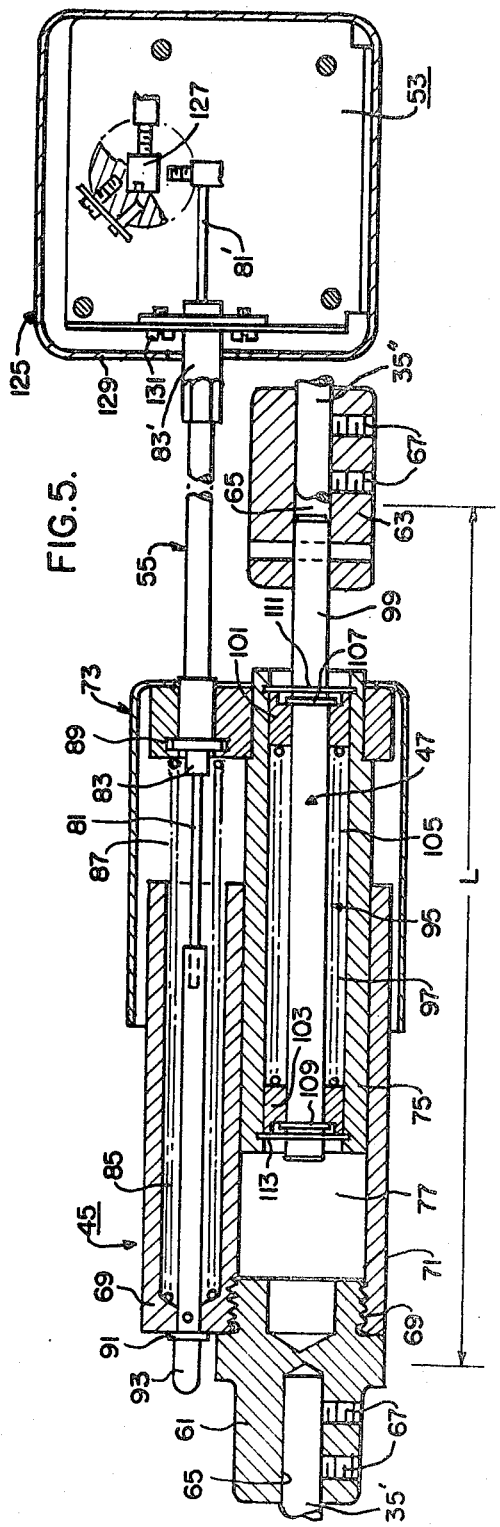

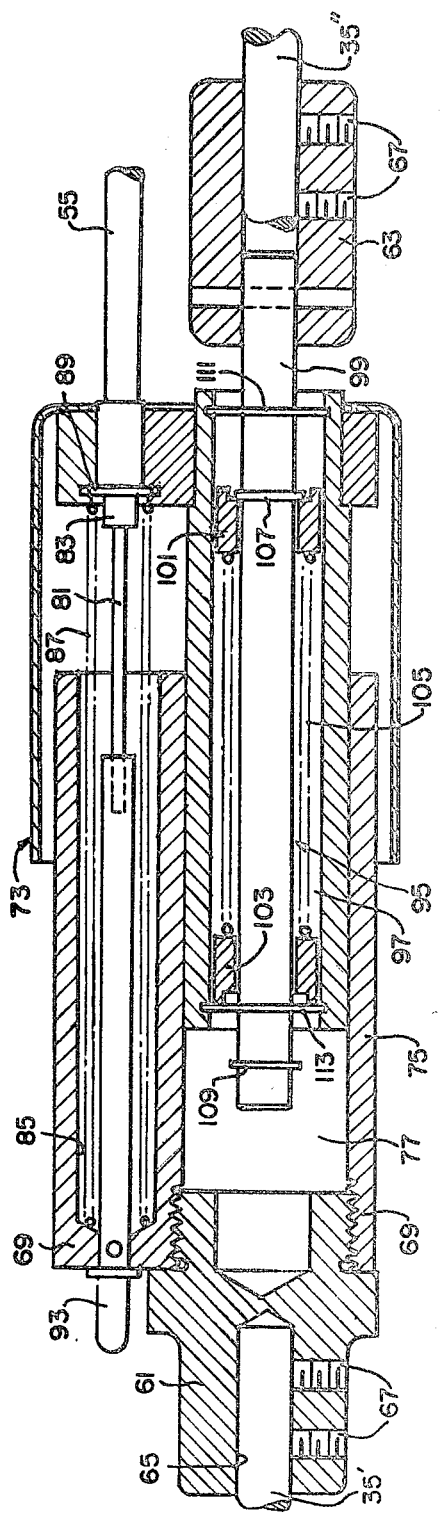
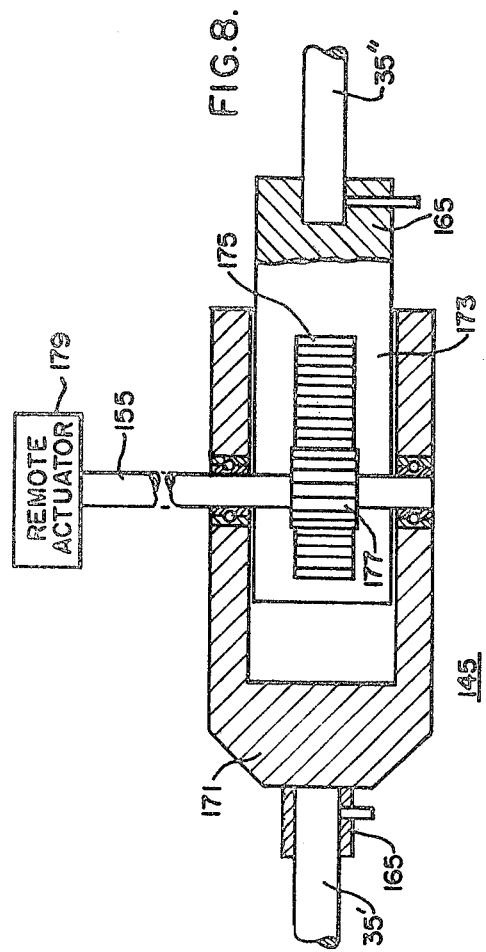
FIG. 7.
FIG. 8.

COMBUSTION CONTROL SYSTEM

BACKGROUND OF THE INVENTION

1. Field of the Invention

The invention relates to a combustion control system typically used with a combustion apparatus such as a boiler, a heater or the like. More particularly, the combustion control system of this invention includes a remotely actuated, linkage strut adjustor apparatus for trim adjustment to the air to fuel ratio of a combustion apparatus. The linkage strut adjustor also protects the control system against mechanical overload damage.

2. Description of the Prior Art

It is known to mechanically connect the valves controlling fuel feed and air intake in order to establish a definite and selectable air to fuel or oxygen to fuel ratio. The simplest and least expensive combustion control system is known as the "jackshaft" or "single-point" positioning system. This system consists of a mechanical linkage arrangement in which a master arm is connected to a main shaft for controlling the fuel valves and a slave arm is connected to the air damper and is responsive to the main shaft through an intermediate linkage strut. Such a mechanical arrangement establishes a master-slave relationship between the fuel and air adjustment devices. The intermediate linkage strut of the prior art system is adjusted, as a result of calibration, to provide a fuel to air ratio which remains unchanged through all load requirements of the combustion apparatus.

However, in order to maximize combustion process efficiency through various load requirements, changes in the BTU value of the fuel, viscosity of the fuel, combustion air temperature, burner clogging, etc., the original, calibrated relationship between fuel and air must be adjusted. Such an adjustment is often referred to as an oxygen trim adjustment and may be necessary several times a day. While such adjustments can be effected by changing the interconnecting points at the opposite ends of the linkage strut, this approach is obviously time consuming and necessitates a recalibration of the jackshaft positioning system.

It is taught in U.S. Pat. No. 4,249,886, which patent is assigned to the assignee of the present application, that an angularly modifiable trim link can be incorporated into a conventional jackshaft positioning system. The trim link allows the conventional master-slave relationship between the fuel control and damper control means to continue. In addition to this relationship, the trim link effects slight adjustments to the damper means in order to better regulate the air-fuel ratio. The specific articulation of the trim link is controlled by a trim positioner means which is responsive to a combustion products analyzing device.

Another control system for a combustion apparatus is taught in U.S. Pat. No. 4,264,297 in which both the length of one of the arms in the master-slave relationship and the length of the intermediate link are adjusted as a function of combustion products generated in the controlled combustion apparatus. The length changes are effected by a piston/cylinder assembly actuated by compressed air or hydraulic fluid or an adjustment screw rotated by an integral electric motor. However, compressed air is unavailable for most commercial applications of this type of control system, hydraulic fluid is dangerous and the space available in most jack shaft systems is not adequate to accommodate the diameter of a motor with sufficient power to adjust the link. The weight of the motor may be too great for support by small diameter links in a jack shaft system.

It is an object of this invention to provide a combustion control system adjustor apparatus which can be readily installed in a conventional jackshaft combustion control system. The adjustor apparatus is a remotely actuated, intermediate linkage strut adjustor which requires a minimum of physical space for installation and operation.

It is also an object of this invention to provide a reliable linkage strut adjustor with a mechanical overload protection means which protects both the linkage strut adjustor and the intermediate linkage strut from damage during jackshaft positioning.

SUMMARY OF THE INVENTION

The present invention is an intermediate linkage strut adjustor apparatus which modifies the longitudinal dimension of the intermediate linkage in order to permit oxygen or air-to-fuel ratio adjustment at all times. The adjustor apparatus includes an overload protection cylinder which minimizes the possibility of mechanical damage to the adjustor and the jackshaft linkage. The adjustor apparatus is easily installed in an existing jackshaft positioning system by replacing a section of the linkage strut with the adjustor apparatus. A remote actuator effects modification of the adjustor apparatus through a cable interconnection.

BRIEF DESCRIPTION OF THE DRAWINGS

The above as well as other features and advantages of this invention will become apparent through consideration of the detailed description in connection with the accompanying drawings in which:

FIG. 5 is a longitudinal, cross-sectional view of a linkage strut adjustor apparatus according to the teachings of this invention;

FIG. 6 is a perspective view of the linkage strut adjustor apparatus mounted in a jackshaft positioning system linkage strut;

FIG. 7 is a longitudial, cross-sectional view of a linkage strut adjustor apparatus in a maximum trim-maximum overload condition; and FIG. 8 is a plan view with portions cut away of an alternative embodiment of this invention.

DETAILED DESCRIPTION OF THE PREFERRED EMBODIMENT

Figure 1:
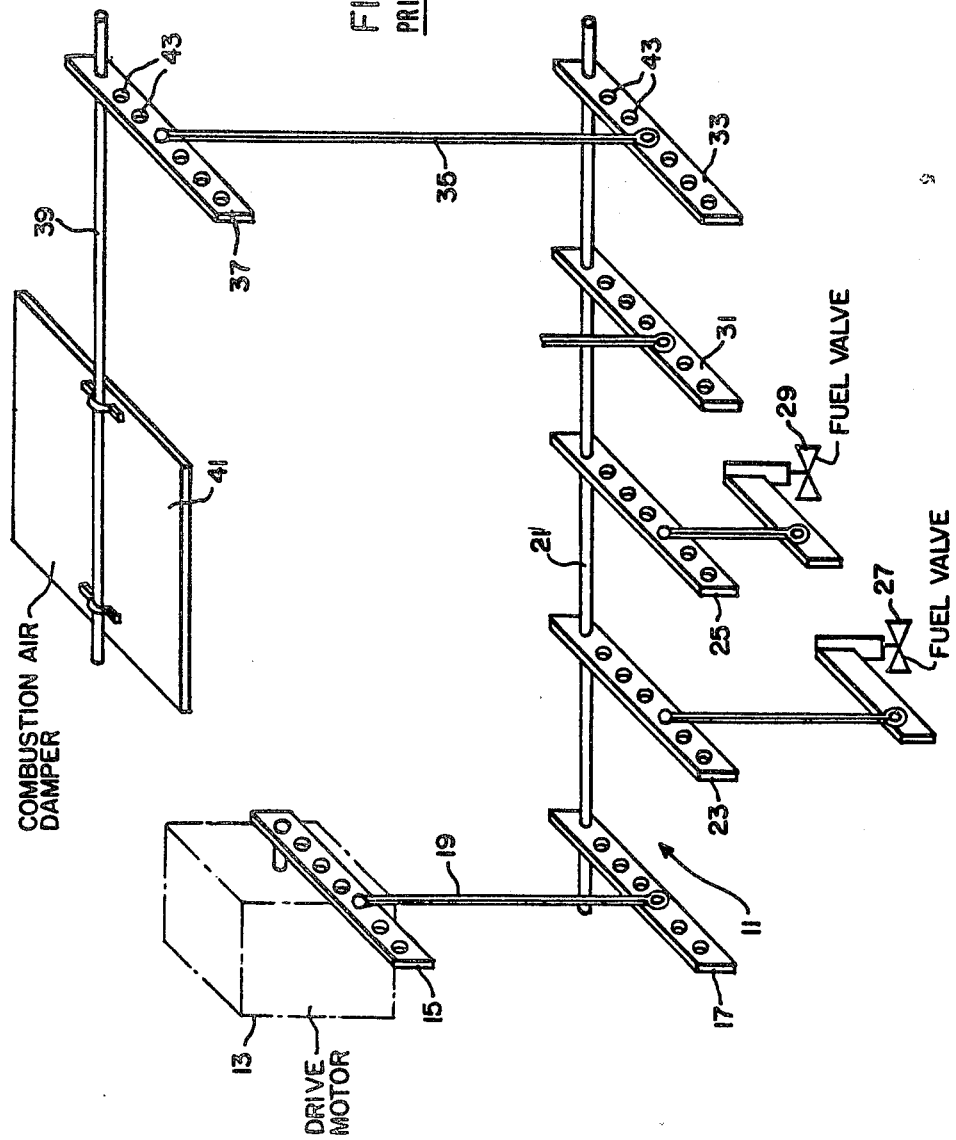
FIG. 1 is a somewhat schematical illustration of a combustion control positioning system according to the prior art.

Referring to FIG. 1, a combustion control system of the prior art known as the "jackshaft" or "single-point" positioning system is shown. This arrangement is often used because of its low cost and reliability, especially in gas and oil fired boiler application. The control system, generally indicated by the reference character 11, includes a drive motor 13 having two arms 15 and 17 interconnected by a linking member 19 for activating a main shaft 21. The main shaft 21 actuates arms 23 and 25 which manipulate fuel valves 27 and 29 respectively and arm 31 which may actuate an optional register (not shown). The fuel valves 27 and 29 normally provide a gas or oil fuel source to the boiler, so only one of the fuel valves would be manipulated at a time. The main shaft 21 also actuates a master member 33 which is interconnected by means of an intermediate linkage strut 35 with a slave member 37 mounted on a second shaft 39. The second shaft 39 is thus a slave of the master shaft 21. When the slave shaft 39 is rotated, a combustion air damper 41 is orientated in different planes to increase or decrease the air intake. All of the arms extending from both shafts 21 and 39 are provided with several holes 43 in order to permit basic ratio adjustment between shafts and connected members (such as fuel valves 27 and 29) to vary the effects of each arm in the system.

Once calibrated to a fixed air-to-fuel ratio, the prior art system of FIG. 1 provides no means of varying the percentage of rotation between the master shaft 21 and the slave shaft 39 without physically loosening the arms 33 and/or 37 and reclamping the same at a new position on its shaft, or changing the length of the intermediate linkage strut 35 by remounting it in a different hole.

On this type of control system, the arms on the master shaft 21 position the fuel valves (oil, gas, etc.). Thus a given position of the shaft 21 represents a specific volume of fuel flow to the burner. Likewise, the position of the slave shaft 39 represents a specific volume of combustion air flow to the burner. If, after an initial relationship between fuel valves and combustion air damper has been established, there occurs a change in the BTU value of the fuel, viscosity of the fuel, combustion air density, valve wear, burner clogging, etc., the original calibrated relationship between fuel and air no longer exists. Such a discrepancy has an obvious impact on combustion efficiency, total fuel cost and polution from the combustion process.

Although the cost of operations can be reduced by maintaining the proper air to fuel ratio, few plants have installed systems that provide a means of controlling the air to fuel ratio. This is at least in part due to the down time required for the installation of such a system and relative complexity of these systems. Often a completely new type of combustion control system has to be designed, or extensive modifications to the existing control system have to be made. In any event, combustion apparatus down time, recalibration of the new system, and expensive installation time are required.

The combustion control system of this invention is discussed in connection with oxygen trim to the air flow in a combustion apparatus. However, it is possible to utilize this combustion control system for fuel flow adjustment as well.

Figure 2:
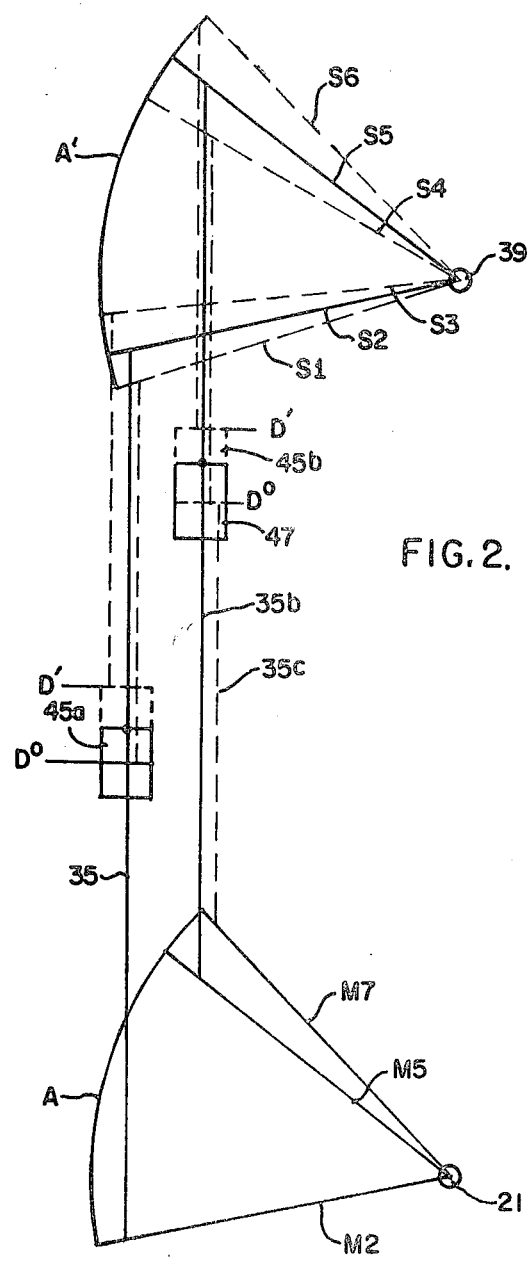
FIG. 2 schematically illustrates the positioning system of FIG. 1 as modified in accordance with the present invention.

Referring now to FIG. 2, the master arm 33 of FIG. 1 is shown in three positions, M2, M5 and M7. The slave arm 37 is shown in six positions, S1 through S6. The arms are mechanically interconnected for coordinated pivotal movement about respective axes 21 and 39 by the intermediate linkage strut 35. The linkage strut adjustor apparatus of this invention is schematically represented and generally indicated by the reference character 45. The adjustor apparatus 45 will be fully described hereinafter. According to the present invention, a short section of the intermediate linkage strut 35 approximately equal to the length of the adjustor apparatus 45 during its null condition is removed and replaced by the adjustor apparatus 45. It should be appreciated that while the linkage strut 35 is being illustrated herein as consisting only of a vertical component extending between two members 33 and 37, quite often, due to the actual location on a combustion apparatus of the master shaft 21 relative to the slave shaft 39, the intermediate linkage strut 35 may include a horizontal or non-vertical component in addition to the vertical component. The strut adjustor apparatus 45 is inserted into the intermediate linkage strut 35 as a portion of the vertical component thereof. By vertical component, what is meant is that component of the linkage which is perpendicular to the axis of the shaft 39 and the axis of master shaft 21.

The master-slave relationship between members 33 and 37 is now a function of the intermediate linkage strut 35 and the strut adjustor apparatus 45. In FIG. 2, the master arm of the main shaft 21 is movable through a predetermined arc of travel A. The slave arm of the slave shaft 39 movable through a predetermined arc of travel A', is shown in a range of positions resulting from the cooperation of the intermediate linkage strut 35 and strut adjustor apparatus 45. Specifically, the calibrated position of the slave member 37 is shown in full for a given load demand and the range of positions available to the slave member as modified by the strut adjustor apparatus 45 is shown in dash-dot lines. For example, when the combustion load demand sets the master member at position M2, the slave member controlling the air damper position is calibrated to position S2. If, for any of the reasons stated above, a more efficient combustion process is obtainable through a slight modification of the air to fuel ratio, the strut adjustor apparatus 45A is selectively movable through a range $D^1$ through $D^0$ which in turn adjusts slave member S2 through a range of positions from S1 through S3. Likewise, for a second load demand position in which the master member is in position M5, the slave member S5 can be adjusted through a range of positions indicated by slave members S4 and S6. The strut adjustor apparatus 45B is selectively movable through a range of positions $D^1$ through $D^0$ to increase or decrease the overall length of intermediate linkage strut 35B.

Another important feature of the subject invention is the overload protection means, indicated generally at 47, which is integral with the strut adjustor apparatus 45. The overload protection means minimizes the possibility of damage occurring to the components of the jackshaft positioning system in situations typified by the following example. Based upon the demand load, the master member is at position M5. Because of air to fuel ratio modification requirements, the slave member is at position S6, shown in dash dot line. Position S6 represents the maximum position of rotational travel available to slave shaft 39 and its associated members. Additionally, the strut adjustor apparatus 45B is expanded to its maximum length as at $D^1$. The air damper is now providing the maximum amount of air to the combustion process. In the event that the load demand requires additional fuel, the master member is rotated by the combustion apparatus' jackshaft system to the position indicated at M7. The slave member S6 is already at its maximum position due to the modification of the intermediate strut length as at 35C by the strut adjustor apparatus 45B. The overload protection means 47 allows the master arm to move a distance approximately equal to the maximum increase in strut length possible through the extension of the adjustor apparatus 45b. In other words, the overload protection means 47 absorbs additional changes signaled to the slave member by the master member when the slave member is at the mechanical limits of its rotational movement.

The strut adjustor apparatus may "retard" as well as advance the air intake and thus select the best air to fuel ratio at any time during operation. The intermediate linkage strut adjustor apparatus 45 is directly applicable to many types of combustion control systems. For instances, it may be applied to any basic jackshaft system, e.g., to the single point positioning system of FIG. 3, or to a two point-parallel positioning system with oxygen trim control and load setpoint programming as shown in FIG. 4.

Figure 3:
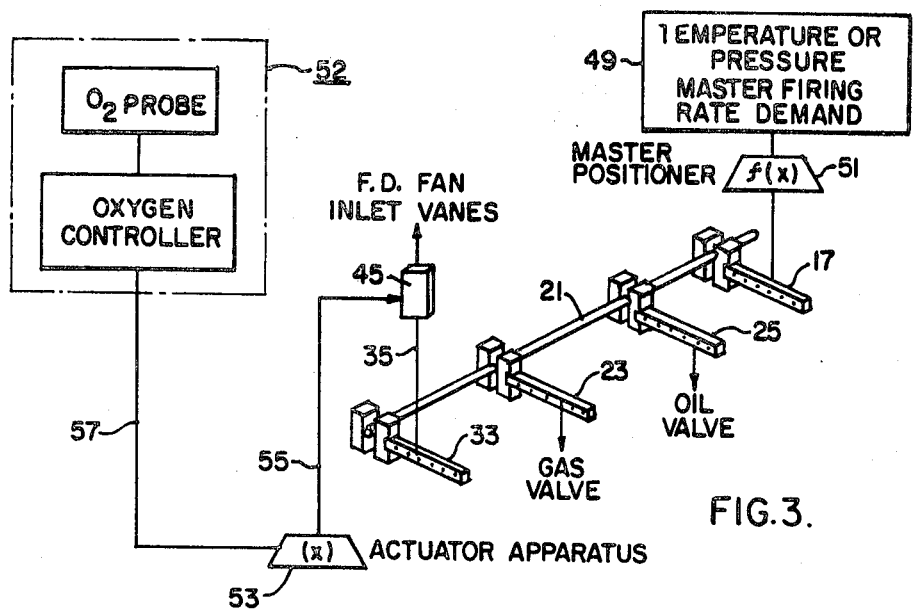
FIG. 3 is a single point jackshaft combustion control system with oxygen trim control and load setpoint programming in accordance with the present invention.
Figure 4:
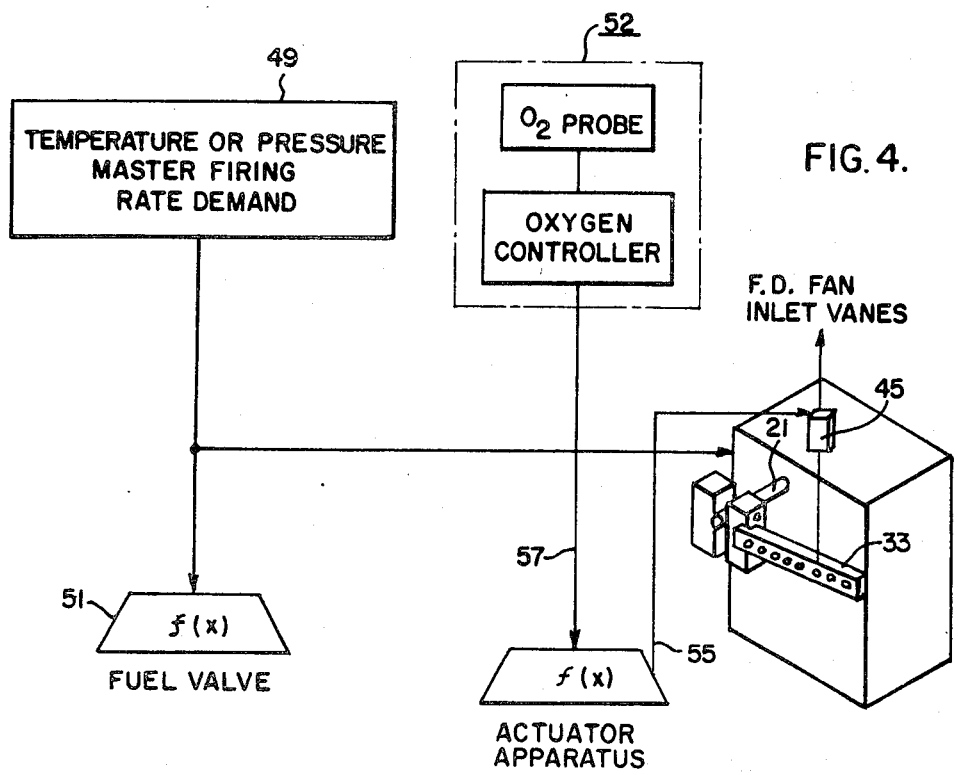
FIG. 4 is a two point parallel combustion control system with oxygen trim control and load setpoint programming in accordance with the present invention.

Referring to FIG. 3, the jackshaft 21 via arm 17 is positioned by a master controller 49 which measures the process variable being controlled, normally either pressure or temperature, and compares it to the desired value. Should an error exist the master controller will take proportional or proportional plus integral action on the error causing the master controller output to move in the proper direction to eliminate the error.

The output change of the master is sent to the master positioner 51 which moves the jackshaft 21 and arm 17. The fuel valves and fan inlet vanes are connected to this jackshaft through shaft 21 and the linkage and levers associated therewith. It is through the effective lengths of the fuel and air levers, and their orientation relative to each other on the jackshaft that the system establishes the fuel/air ratio over the entire operating range.

With a fixed fuel/air ratio, along with the difficulty of changing this ratio, there is a need for an inexpensive method of changing the fuel/air ratio to take advantage of the fuel savings trim systems used on larger boilers. Therefore, the linkage strut adjustor apparatus 45 associated with intermediate linkage strut 35 is governed through an oxygen trim control system 52. The control system 52 consisting of an oxygen probe and an oxygen controller responsive to the output signal of the probe is connected to the trim positioner, actuator apparatus 53. Linkage means 55 connect the actuator apparatus 53 to the strut adjustor apparatus 45.

The $O_2$ controller 52 output on line 57 will adjust the position of the intermediate linkage strut 35 thus increasing or decreasing the air flow which will change the air to fuel relationship.

The load index signals which may be available to represent boiler load will probably be somewhat limited on a jackshaft control system. The master control signal or steam flow are acceptable signals available and compatible with the oxygen trim control.

The addition of the oxygen trim control will compensate for the changes in fuel as well as boiler and atmospheric conditions.

Referring to FIG. 4, an oxygen trim system like the system schematically shown in FIG. 3, is added to a parallel positioning system. Here the master controller 49 actuates the master shaft 21 while the fuel valves are directly controlled by the master positioner 51 rather than by the master shaft 21. The oxygen trim system 52 regulates the actuator apparatus through line 57. The linkage strut adjustor 45 is responsive to the actuator apparatus 53 through linkage means 55. The addition of the oxygen trim control will compensate for the changes in fuel as well as boiler and atmospheric conditions by responding to the oxygen content in the flue gases.

Considering FIG. 5, the linkage strut adjustor apparatus 45 is shown in longitudinal cross-section and interconnected with the intermediate linkage strut 35. An important feature of the strut adjustor 45 is the simplicity of its installation procedure. In its null condition, the strut adjustor 45 has a predetermined length "L". A section of the original linkage 35 of equivalent length is removed and the strut adjustor apparatus mounted in its place. The strut adjustor apparatus 45 is secured to the intermediate linkage strut ends 35' and 35" by receiving means 61 and 63 respectively, each of which receiving means includes a bore 65 and securing means such as set screws 67 threadedly received therein. The receiving means 61 together with the housing 69 defines a first member 71. The first member 71 is movably interconnected to a second member 73 for reciprocal movement toward and away from the second member 73. The second member 73 includes an elongated portion 75 which is slidably seated in a corresponding bore 77 in the first member 71 and in axial alignment with intermediate linkage strut 35. As seen in FIG. 6, an overtravel stop 79 limits the reciprocal travel of the two members 71 and 73 relative to each other and functions as a means for inhibiting the rotational movement of the two members 71 and 73 relative to each other. The elongated portion 75 can be round or any convenient cross-section and can include a key system to restrict rotational movement.

The reciprocal movement is effected by linkage means 55, a push-pull cable drive system, having a cable core 81 in a cable sheath 83. The first member 71 includes a bore 85 in which a biasing means, such as cable tension spring 87 is seated. The spring 87 is preloaded to maintain a continuous biasing pressure between the two members 71 and 73 through their entire range of reciprocal travel. Because the spring 87 is always under compression, the strut adjustor apparatus 45 does not experience back lash or lost motion. The cable sheath 83 is anchored to the second member 73 by anchor means 89 and the cable core 81 passes through the open center of the spring 87 and is secured to the first member 71 by securing means 91 at cable end 93. As the cable end 93 is drawn back toward the cable sheath 83 by the actuator apparatus 53, the first member moves toward the second member, resulting in a decrease in the length of the strut adjustor apparatus 45 and the overall length of the intermediate linkage strut 35. When tension on the cable core 81 is relaxed, the spring 87 biases the two members 71 and 73 apart, causing an increase in the adjustor apparatus length.

The actuator apparatus 53 includes an electric motor 125 which actuates the push-pull cable drive system 55 by a 90° rotation output motor shaft 127. The end of the cable sheath 83' is anchored to the shaft housing 129 by an anchor means 131. The cable core 81' is secured to the pulley of the motor shaft 127 whereby the aforedescribed cable core movement is effected by actuation of the electric motor 125.

The overload protection system 47 as described in connection with FIG. 2 is comprised of a third member 95 and its associated components.

A third member 95 is mounted in a chamber 97 defined by the elongated portion 75 of the second member 73. A piston 99, spring seats 101 and 103, and compression spring means 105 are mounted therebetween. A pair of internal stop rings 107 and 109 are attached to the piston 99 and a pair of external stop rings 111 and 113 are attached to the elongated portion 75 of the second member 73. The overload protection system 47 is maintained in its null position, as illustrated, during typical operating conditions. However, in the event that the load demand and trim adjust requirements exceed the jack-shaft system capacity, the overload protection system 47 minimizes the possibility of damage to the jack shaft system.

In the overload condition illustrated in connection with FIG. 2, both trim control and load demand are at their maximum respective positions. Turning to FIG. 7, the operation of the overload protection cyclinder will be described in that condition. As the piston 99 is urged toward the first member 71, the internal stop ring 107 engages spring seat 101. Spring seat 103 rests against the external stop ring 113 and spring means 105 is compressed therebetween. When the overload condition abates, the piston 99 returns to its null state. If an overload condition occurs in the opposite direction, spring set 101 abuts external stop ring 11 and internal stop ring 109 engages spring seat 103, causing spring means 105 to compress.

The range of reciprocal movement available to the adjustor apparatus is indicated in FIG. 6. The adjustor apparatus 45 is able to increase the overall length of the linkage strut 35 a distance "$D^1$" and decrease the length a distance "$D^0$" relative to normal or rest position N as shown. Additionally, the overload protection cylinder 47 has a travel range from its neutral-nonoverload state $N^1$ a distance "$OL^1$" which decreases linkage strut length and a distance "$OL^0$" which increases strut length.

An alternative embodiment of an intermediate linkage strut adjustor apparatus 145 is shown in FIG. 8. The adjustor apparatus 145 includes a first member 171 and a second member 173 each of which includes means 165 for interconnection with the ends 35' and 35" of the intermediate linkage strut 35. The second member 173 is movably mounted within the first member 171 in order to modify the longitudinal dimension of the adjustor apparatus 145. A rack 175 and pinion gear 177 driven by an actuator apparatus such as an electric motor 179 effect length modifications. The actuator apparatus 179 is remotely mounted relative to the intermediate linkage strut 35, but in mechanical communication therewith through a cable means 155. The overload protection system of this invention can be readily incorporated into the alternative embodiment described herein.

What has been described is an intermediate linkage strut adjustor apparatus which is actuated by a remotely located electric motor in communication therewith by means of a push-pull cable interconnection. The adjustor apparatus is inserted into the intermediate linkage of a jack shaft system and the motor is mounted in a convenient location on or adjacent the boiler.

What is claimed is:

1. A combustion control system for a combustion apparatus supplied with fuel which is mixed with an intake of a combustive agent, including oxygen, said combustion apparatus having a master member movably mounted about a first axis for regulating the amount of fuel supplied, a slave member movably mounted about a second axis for regulating the amount of combustive agent intake and an intermediate linkage strut having a fixed longitudinal dimension connected between said master member and said slave member for establishing a master-slave relationship for travel through relative predetermined arcs of travel which provides a fixed combustive agent to fuel ratio, said combustion control system comprising:
    a linkage strut adjustor apparatus, longitudinally expandable and contractable, in mechanical communication with said intermediate linkage strut to modify the longitudinal dimension thereof such that said master slave relationship is a function of said adjustor apparatus;
    actuator means for effecting said longitudinal expansion and contraction of said linkage strut adjustor apparatus, remotely disposed relative to said linkage strut adjustor apparatus and in mechanical communication therewith, wherein the actuator means is in mechanical communication with the adjustor apparatus by means of a cable means whereby said remotely disposed actuator means effects the modification of the longitudinal dimension of the adjustor apparatus by said cable means.

2. The combustion control system of claim 1 including monitoring means for determining the efficiency of combustion in the combustion apparatus and wherein the actuator means is responsive to said monitoring means in effecting the modification of the longitudinal dimension of the adjustor apparatus.

3. The combustion control system of claim 1 wherein the linkage strut adjustor apparatus comprises a first member having mounting means for interconnection with the intermediate linkage strut; a second member movably interconnected with said first member for selectable reciprocal movement relative thereto, said selectable reciprocal movement being effected by the actuator means, and a third having mounting means for interconnection with said intermediate linkage strut, said third member being movably interconnected to said second member for restricted reciprocal movement relative thereto when at least one of the predetermined arcs of travel of the master-slave relationship is exceeded.

4. The combustion control system of claim 3 wherein the third member includes biasing means for maintaining said third member in a substantially fixed position relative to said second member when the master-slave relationship is within the predetermined arc of travel; said biasing means being compressible to allow the restricted reciprocal movement of said third member relative to the second member, whereby the longitudinal dimension of the intermediate linkage strut is increased or decreased to maintain the master member extremity and/or the slave member extremity within their relative predetermined arcs of travel.

5. The combustion control system of claim 4 wherein the first member includes a housing having an orifice therein and the second member includes a housing having an elongated portion slidably insertable into said orifice whereby said first member and said second member are reciprocally movable relative to each other, and wherein said first and second members include means for preventing relative rotational movement.

6. The combustion control system of claim 5 wherein the selectable reciprocal movement of the first and second members for the modification of the longitudinal dimension of the intermediate linkage strut is actuated by a cable drive means and wherein the first and second members include a biasing means disposed therebetween to cooperate with said cable drive means for effecting said selectable reciprocal movement.

7. The combustion control system of claim 6 wherein the elongated portion of the second member housing includes a chamber and the third member includes an elongated shaft portion insertable therein and wherein the compressible biasing means for restricted reciprocal movement of said third member relative to said second member is retained within the second member housing chamber.

8. The combustion control system of claim 5 wherein the linkage strut adjustor apparatus includes over travel stop means to restrict the selectable reciprocal movement of the first member relative to the second member.

9. The combustion control system of claim 8 wherein the over travel stop means prevents rotational movement of the first and second members relative to each other.

10. A combustion control system for a combustion apparatus supplied with fuel which is mixed with an intake of a combustive agent, including oxygen, said combustion apparatus having a master member movably mounted about a first axis for regulating the amount of fuel supplied, a slave member movably mounted about a second axis for regulating the amount of combustive agent intake and an intermediate linkage strut having a fixed longitudinal dimension connected between said master member and said slave member for establishing a master-slave relationship for travel through relative predetermined arcs of travel which provides a fixed combustive agent to fuel ratio, said combustion control system comprising:

a linkage strut adjustor apparatus comprising a first member having mounting means for interconnection with the intermediate linkage strut, a second member movably interconnected with said first member for selectable reciprocal movement relative thereto, and a third member having mounting means for interconnection with the intermediate linkage strut, said third member being movably interconnected to said second member for restricted reciprocal movement relative thereto when at least one of the predetermined arcs of travel of the master-slave relationship is exceeded;

actuator means for effecting said selectable reciprocal movement, said actuator means being remotely disposed relative to said linkage strut adjustor apparatus and in mechanical communication therewith.

11. The combustion control system of claim 10 wherein the third member includes biasing means for maintaining said third member in a substantially fixed position relative to said second member when the master-slave relationship is within the predetermined arc of travel; said biasing means being compressible to allow the restricted reciprocal movement of said third member relative to the second member, whereby the longitudinal dimension of the intermediate linkage strut is increased or decreased to maintain the master member extremity and/or the slave member extremity within their relative predetermined arcs of travel.

12. The combustion control system of claim 11 wherein the first member includes a housing having an orifice therein and the second member includes a housing having an elongated portion slidably insertable into said orifice whereby said first member and said second member are reciprocally movable relative to each other, and wherein said first and second members include means for preventing relative rotational movement.

13. The combustion control system of claim 12 wherein the selectable reciprocal movement of the first and second members for the modification of the longitudinal dimension of the intermediate linkage strut is actuated by a cable drive means and wherein the first and second members include a biasing means disposed therebetween to cooperate with said cable drive means for effecting said selectable reciprocal movement.

14. The combustion control system of claim 13 wherein the elongated portion of the second member housing includes a chamber and the third member includes an elongated shaft portion insertable therein and wherein the compressible biasing means for restricted reciprocal movement of said third member relative to said second member is retained within the second member housing chamber.

15. The combustion control system of claim 12 wherein the linkage strut adjustor apparatus includes over travel stop means to restrict the selectable reciprocal movement of the first member relative to the second member.

16. The combustion control system of claim 15 wherein the over travel stop means prevents rotational movement of the first and second members relative to each other.

* * * * *